United States Patent [19]

Usui et al.

[11] 4,136,576
[45] Jan. 30, 1979

[54] COUNTERSHAFT TYPE POWER TRANSMISSION

[75] Inventors: Keizaburo Usui; Isao Hayama, both of Yokohama, Japan

[73] Assignee: Nissan Motor Company, Limited, Yokohama, Japan

[21] Appl. No.: 816,147

[22] Filed: Jul. 15, 1977

[30] Foreign Application Priority Data

Jul. 15, 1976 [JP] Japan .................. 51-84623

[51] Int. Cl.² ............................................. G05G 9/00
[52] U.S. Cl. ...................... 74/473 R; 74/339; 74/480 R; 92/29
[58] Field of Search ............... 74/473 R, 480 R, 339; 92/29

[56] References Cited

U.S. PATENT DOCUMENTS 2,478,173  8/1949  Austin ........................ 74/480
2,590,716  3/1952  Lisle ........................ 92/29 X Primary Examiner—Allan D. Herrmann
Attorney, Agent, or Firm—Richard L. Schwaab

[57] ABSTRACT

A countershaft type power transmission comprises a select shaft operatively connected with a select motor and a shift shaft operatively connected with a shift motor. The select motor and shift motor actuate the select shaft and shift shaft in response to various vehicle operating conditions, including the position of a control lever so as to engage a desired gear within the transmission. Means is provided for temporarily connecting the operative connecton between the shift motor and the shift shaft when the control lever is moved toward and into the reverse position, so that the shift shaft can be manually rotated via a mechanical connection between the control lever and the shift shaft to engage reverse gear.

2 Claims, 4 Drawing Figures

COUNTERSHAFT TYPE POWER TRANSMISSION

RELATED APPLICATION

Reference is made to Applicants' copending U.S. patent application Ser. No. 788,549 filed Apr. 18, 1977 in the name of Keizaburo USUI et al., for COUNTERSHAFT TYPE AUTOMATIC POWER TRANSMISSION.

BACKGROUND OF THE INVENTION

This invention relates to a countershaft type power transmission and more particularly to an improvement to a countershaft type power transmission as disclosed in the above referenced copending U.S. Pat. Application.

As in the copending U.S. Patent Application, it is proposed to make a gear shifting operation automatically in response to various vehicle operating conditions including a vehicle speed, a throttle opening degree and a position of a control lever.

For making a shift, a clutch, disposed between an engine and a gear box, will be disengaged by a vacuum motor and then a select shaft and a shift shaft are actuated to effect engagement of a desired gear of the gear box by the corresponding hydraulic motors. For engaging a reverse gear, the control lever is disposed at a reverse position, producing a predetermined signal to cause the clutch to be disengaged. After disengagement of the clutch, a hydraulic motor operatively connected to a select shaft rotates the select shaft to one of the plurality of angular positions to select a reverse fork rod and thereafter, another hydraulic motor operatively connected to a shift shaft rotates the shift shaft to one of the plurality of angular positions to move the reverse fork rod in a direction to engage a reverse gear. Since the knob of the control lever must be kept gripped to keep the clutch disengaged, the knob must be released to cause the clutch to reengage or ready for reengagement when the shift has been completed.

The problem with this transmission resides in the fact that gears for the reverse may fail to mesh with each other even if the control lever is moved to the reverse position or may grind with each other upon release of the knob after the control lever has been moved to the reverse position. This occurs when the gears for the reverse are misalinged. Under this condition, even if the control lever is at the reverse position, one of the teeth of the sliding gear on the main shaft will abut with one of the teeth of the reverse gear on the counter shaft, failing to engage in a space between two adjacent teeth of the reverse gear. Accordingly, even if the gears become aligned afterwards, after or upon engagement of the clutch, the gears will not mesh with each other because there is no lost motion connection between the shift shaft and the corresponding motor.

SUMMARY OF THE INVENTION

It is therefore an object of the present invention to provide a countershaft type power transmission in which when a control lever is moved toward and into a reverse position from a neutral position, the operative connection between a shift shaft and a corresponding hydraulic motor is disconnected so that the shift shaft can be manually rotated to a desired angular position, while when the control lever is at neutral or is moved between neutral and at least one forward drive position, the gear shifting operation is accomplished by hydraulic motors for the shift and select shafts.

BRIEF DESCRIPTION OF THE DRAWINGS

The invention will be described hereinafter in connection with the accompanying drawings, in which.

DETAILED DESCRIPTION OF PREFERRED EMBODIMENTS

Figure 1:
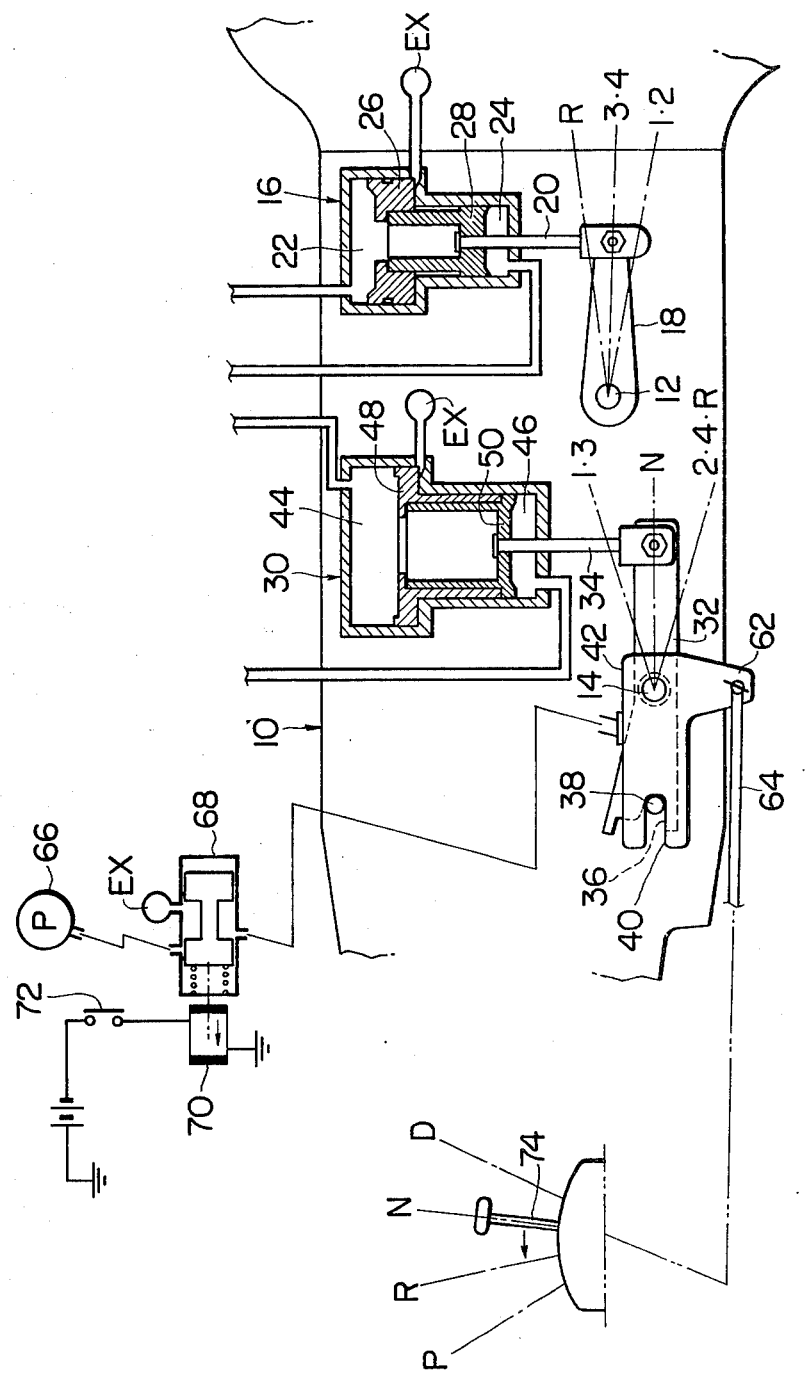
FIG. 1 is a diagrammatic view of a countershaft type power transmission according to the invention.

FIG. 1 shows diagrammatically a part of a countershaft type power transmission 10 which is provided with a select shaft 12 and a shift shaft 14.

The select shaft 12 is operatively connected to a select motor 16 via a select lever 18 rigidly connected to the select shaft 12 and linked to an actuating rod 20 of the select motor 16. The select motor 16 is arranged to be operated by supplying hydraulic chambers 22 and 24 with pressurized fluid from a source of hydraulic pressure (not shown) and has slidably disposed therein a first piston 26 exposed to the chamber 22 and a second piston 28 having a small area side exposed to the chamber 22 and a large area side exposed to the other chamber 24, to the latter piston 28 the actuating rod 20 being securely connected.

Figure 3:
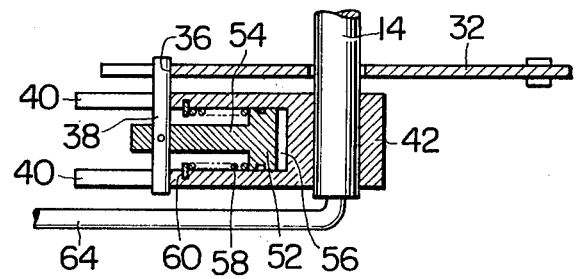
FIG. 3 is a sectional view taken through line III—III of FIG. 4.

The shift shaft 14 is operatively connectable to a shift motor 30. A shift lever 32 has one end linked to an actuating rod 34 of the shift motor 30 and an opposite end formed with a groove 36 for receiving a pin 38. As best seen in FIG. 3, the shift lever 32 has an intermediate portion rotatably mounted on the shift shaft 14. The pin is guided by a guide groove 40 formed at an open end of a cylinder 42 fixedly connected to the shift shaft 14. The shift motor 30 is arranged to be operated by supplying hydraulic chambers 44 and 46 with pressurized fluid from the source of hydraulic pressure and has slidably disposed therein a first piston 48 exposed to the chamber 44 and a second piston 50 having a small area side exposed to the chamber 44 and a large area side exposed to the other chamber 46, to the latter piston 50 the actuating rod 34 being securely connected.

Figure 2:
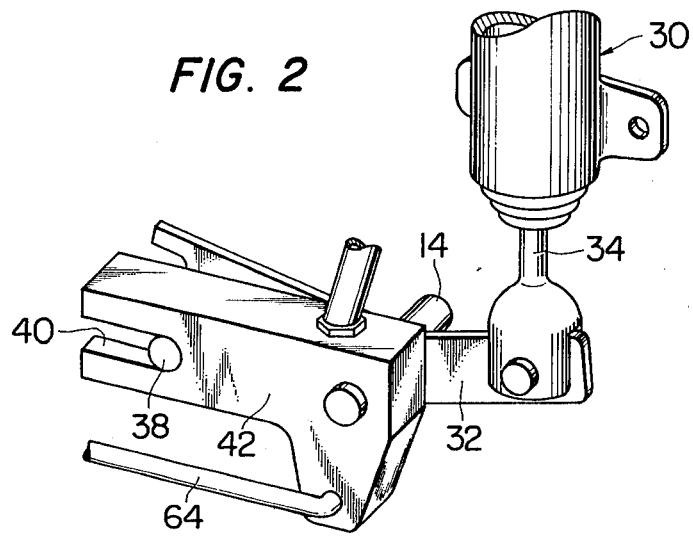
FIG. 2 is a perspective view of a mechanical connection between a shift shaft and a shift motor.
Figure 4:
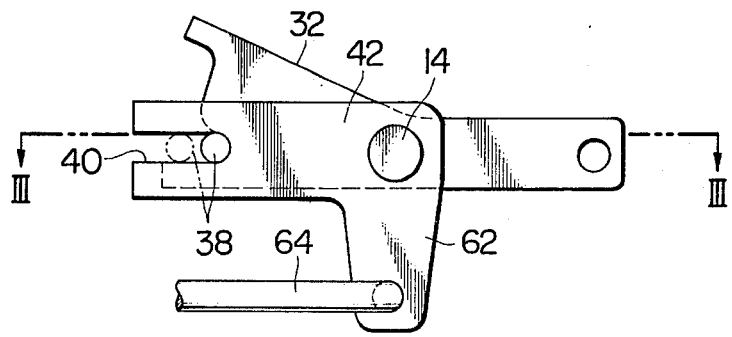
FIG. 4 is a side view of the mechanical connection shown in FIG. 2.

Referring to FIGS. 2 through 4, the cylinder 42 has slidably disposed therein a piston 52 having an integral plunger 54 fixedly connected to the pin 38. The piston 52 is exposed to a hydraulic chamber 56 within the cylinder 42 and biased toward the chamber 56 by means of a spring 58 disposed between the piston 52 and a fixed retainer 60. For manually rotating the cylinder 42 about the shift shaft 14, the cylinder 42 has a projecting arm 62 and a control rod 64 is linked to the arm 62.

As shown in FIG. 1, pressurized fluid is selectively applied to the chamber 56 of the cylinder 42 from a pump 66 under the control of a selector valve 68 which is actuable by a solenoid 70. The solenoid 70 is electrically connected in series with a normally open switch 72 which is designed to be kept closed when a control lever 74 is moved toward a reverse position (R) from a neutral position (N), is disposed at the reverse position and until returned to the neutral position. When the solenoid 70 is deenergized, the selector valve 68 takes the illustrated position to drain hydraulic fluid from the chamber 56, while when energized the solenoid 70 will cause the selector valve 68 to apply hydraulic fluid to the chamber 56.

Although not shown, the control rod 64 is operatively connected to the control lever 74 such that only when the control lever 74 is moved toward the "R" position from the "N" position, is disposed at the "R" position and is moved from the "R" position toward the "N" position, manipulation of the control lever 74 will rotate the shift shaft 14.

The operation is as follows:

As long as the control lever 74 is in the "N" position or the "D" position, the switch 72 is kept open so that the valve 68 is in the illustrated position to drain the fluid within the chamber 56 (see FIG. 3). When the fluid within the chamber 56 is drained, the piston 52, due to the force of the spring 58, takes the position illustrated in FIG. 3 to engage the pin 38 in the groove 40, thus securing operative connection between the shift lever 32 and the cylinder 42.

When the control lever 64 is in the "N" position, the select motor 16 causes the select shaft 18 to take a position, denoted by 3.4, as illustrated in FIG. 1, while the shift motor 30 causes the shift shaft 14 to take a position, denoted by "N", as illustrated in FIG. 1.

When the control lever 74 is at the "D" position, the select motor 16 and the shift motor 30 move the select shaft 12 and the shift shaft 14, respectively, so as to engage a suitable gear of the transmission 10 in response to various signals representing the engine and vehicle operating conditions.

Upon engaging a first gear, the hydraulic chamber 24 of the select motor 16 is exhausted and the piston 28 urged downwardly (viewing in FIG. 1) to rotate the select lever 18 toward a position, denoted by 1.2, from the illustrated position, and subsequently, the hydraulic chamber 44 of the shift motor 30 is exhausted and the piston 50 is urged upwardly from the illustrated position, tending to move the shift lever 32, about the shift shaft 14, upwardly (viewing in FIG. 1). This movement of the shift lever 32 is transmitted to the shift shaft 14 to cause the shift shaft 14 to move toward a position, denoted by 1.3, from the illustrated position because the pin 38 transmits motion between the shift lever 32 and the cylinder 42.

The control of and operation of the select and shift motors 16 and 30 can be understood when reference is made to U.S. patent application Ser. No. 788,549.

Upon initial stage of movement of the control lever 74 toward "R" position from the "N" position, the switch 72 is closed to energize the solenoid 70. Energization of the solenoid 70 will cause the valve 68 to apply hydraulic fluid to the chamber 56 of the cylinder 42 leftwardly (viewing in FIG. 3), against the action of the spring 58, to disengage the pin 38 from the groove 36 of the shift lever 32. Thus the cylinder 42 and the shift lever 32 are disconnected and motion between the shift lever 32 and the cylinder 42 is no longer transmitted.

The cylinder 42 is now able to be manually rotated from the illustrated position to a position, denoted by 2.4.R, to engage a reverse gear of the transmission 10 only by pulling the control rod 64 leftwardly (viewing in FIG. 1).

It will be understood that rendering the shift shaft 14 to be manually operable has made it possible to feel on the part of a driver whether the gears for the reverse have meshed with each other because if the gears are misaligned with each other, the control lever 74 will not assume the "R" position. If the gears for the reverse are misaligned with each other, the clutch should be reengaged to align the gears.

What is claimed is:

1. A countershaft type power transmission for shifting gears, comprising: a select motor; a select shaft operatively connected with said select motor; a shift motor; a shift shaft operatively connected with said shift motor, said shift shaft and said select shaft cooperating so that rotation thereof selectively engages the gears of the power transmission to shift the transmission between at least one forward speed, neutral and a reverse speed; a control lever having at least one forward drive position, and neutral position and a reverse position; and means for disconnecting the operative connection between said shift motor and said shift shaft in response to movement of said control lever toward and into the reverse position.

2. A countershaft type power transmission as claimed in claim 1, in which said disconnecting means comprises:
    a cylinder affixed to said shift shaft for integral rotation, said cylinder having a piston slidably disposed therein to form a chamber within said cylinder, a pin movable by said piston and a spring means for biasing said piston toward said chamber;
    a shift lever having one end operatively connected with said shift motor and an opposite end formed with groove means for receiving said pin, said shift lever being rotatably mounted on said shift shaft;
    manually operable means for rotating said cylinder; and
    means for applying pressure to said chamber to move said piston, against the action of said spring, to disengage said pin from said groove means in response to movement of said control lever toward and into the reverse position.

* * * * *